United States Patent
Lund

[15] 3,668,866
[45] June 13, 1972

[54] ALCOHOLIC CONCENTRATION INDICATOR

[72] Inventor: Herbert Z. Lund, 3610 Kirby Drive, Greensboro, N.C. 27403

[22] Filed: July 30, 1970

[21] Appl. No.: 59,565

Related U.S. Application Data

[63] Continuation-in-part of Ser. No. 35,416, May 5, 1970, abandoned.

[52] U.S. Cl. .................................................. 58/152, 116/133
[51] Int. Cl. ............................................................ G07c 1/00
[58] Field of Search ........ 58/152; 116/133; 128/2 C, DIG. 17

[56] References Cited

UNITED STATES PATENTS

3,327,470  6/1967  Kuzara ............................... 58/4 M
3,472,018  10/1969  Papworth ............................ 58/4 M

*Primary Examiner*—Richard B. Wilkinson
*Assistant Examiner*—Edith C. Simmons
*Attorney*—Hunt, Heard & Rhodes

[57] ABSTRACT

A rotating dial-type indicator for illustrating the approximate theoretical alcoholic concentration in the blood of an average man as related to the volume of alcohol consumed, weight of the individual, and time elapsed. The indicator includes at least two circular scales, one being rotatable with respect to the other; one of the scales representing time, the other representing alcoholic concentration in the blood. A limit means is provided for discreetly rotating one of the scales throughout a prescribed arc, which may be selectively varied according to the weight of an individual.

22 Claims, 16 Drawing Figures

PATENTED JUN 13 1972 3,668,866

INVENTOR
HERBERT Z. LUND

BY Hunt, Heard & Rhodes

ATTORNEY

INVENTOR
HERBERT Z. LUND

BY Hunt, Heard & Rhodes

ATTORNEY

INVENTOR
HERBERT Z. LUND

BY *Hunt, Heard & Rhodes*

ATTORNEY

INVENTOR
HERBERT Z. LUND

BY *Hunt, Heard & Rhodes*

ATTORNEY

ALCOHOLIC CONCENTRATION INDICATOR

REFERENCE TO RELATED APPLICATIONS

The present application is a Continuation-In-Part of applicant's copending application Ser. No. 35,416, filed May 5, 1970 which is now abandoned.

BACKGROUND OF THE INVENTION

The present invention resides in the adaptation of a rotary dial having a scale of alcoholic concentration indicia thereon used in conjunction with a watch, clock, or simulated clock face for the purpose of illustrating the quantitative aspects of the metabolism of alcohol. The dial can also be used by a person during the consumption of alcohol as a precautionary reference by computing a theoretical alcoholic concentration at any given time for an average person of his weight consuming a like of alcohol. It should be stressed here that the dial deals with averages only, and the readings reflect the alcoholic concentration for an average person, not necessarily the person using the dial.

After ingesting a given quantity of alcohol, the concentration of blood alcohol varies according to the size of the person, and more specifically, according to the fluid content of his body which is roughly paralleled by his weight. The ingested alcohol is rapidly absorbed and diffused throughout the tissues. Thus, if a person weighing seventy kilograms (about 154 lbs.) rapidly drinks the equivalent of seventy grams of alcohol (89 cc. or about 3 fluid oz. of straight alcohol; about 178 cc. or about 6 fluid oz of 100 proof whiskey), and if it were instantly absorbed and diffused throughout the body, the average concentration of alcohol would be 70 grams in 70,000 grams of tissue or 0.10 grams per 100 grams of tissue. In individual tissues the concentration of alcohol will vary according to their wetness, and it is known that the alcohol concentration in the blood (blood alcohol) of the average man is approximately 1.47 times the alcohol concentration in the tissues as a whole. Thus, in the above instance, the blood alcohol would be about 0.147 gm. per 100 gm. of blood. It therefore follows that each ounce of 100 proof whiskey consumed by a seventy kilogram man should bring about an increase of blood alcohol of approximately 0.025 gm. per 100 gm. of blood if factors of time of absorption and rate of metabolism are disregarded.

The principles involved in the quantitative aspects of the metabolism of alcohol are based upon the observations and hypotheses of E. M. P. Widmark, as described in Harger, R. N. and Hulpieu, H. P., "The Pharmacology of Alcohol", in Alcoholism, ed. by G. N. Thompson, pp. 103–232, Charles C. Thomas, 1956. From these principles the increase of the concentration of blood alcohol in the average man, disregarding time, brought about by ingesting 29.5737 cc. (1 fluid ounce - U.S.) of 100 proof whiskey can be determined by the following formulas: 1.717/weight (kg.) = alcohol concentration (expressed as gm. per 100 gm.) 3.785/weight (lb.) = alcohol concentration (expressed as gm. per 100 gm.) Some references specify blood alcohol concentration in gm. per 100 ml. as opposed to gm. per 100 gm., and to convert the formulas above, numerators are merely multiplied by 1.055, the average specific gravity of blood. In the device herewith described calculations and adjustments have been made for 1 fluid ounce (U.S.) and concentrations are expressed as gm. per 100 gm.

These formulas apply to men of average build. Women on the average have a higher fat content in their tissues than men. Fat is a relatively dry tissue and does not take up as much alcohol as wetter tissues. Hence, in theory, the increase of alcoholic concentration in the blood of average women brought about by a unit of alcohol will be higher than that of average men. According to Widmark's averages it is about 1.24 times as high.

The alcoholic concentration in the blood decreases with time in a living organism at an approximately steady rate after it has been absorbed and diffused throughout the tissues. This is predominantly a result of metabolism, although a small amount is lost by excretion in the urine and expired air. There is some variation among different individuals as to the exact rate of decrease of alcohol in the blood. Reported average rates are in the vicinity of 0.015 per cent per hour (some are higher, others lower). A rate of 0.015 gms. per 100 gm. per hour is presumed sufficiently accurate for use with the present application. A decrease of 0.015 gm. per 100 gm. per hour is the same as 0.180 gm. in twelve hours coinciding in the device herewith presented with a 360 degree sweep of a clock's hour hand. It is generally considered that the diminution of the alcoholic concentration is approximately linear, and fairly constant for a given individual.

Immediately after alcohol is ingested, blood concentrations are not accurately predictable. Not only is there the matter of absorption but even during absorption, alcohol is being metabolized as described above. Therefore the readings on the device disclosed herein are most significant with drinking on an empty stomach and beginning approximately one hour after consumption is completed.

SUMMARY OF THE INVENTION

The present invention is embodied in a useful device illustrative of the data set forth hereinabove, and in this respect is directed to a rotary dial or bezel which may be used with a simulated clock face, an actual clock face, or with a wrist watch. Such a device may be used either for instructional purposes or for a precautionary reference indicating to a person consuming alcohol the theoretical blood alcohol content of an average man of his weight at any one time and also indicating the time the average man will be free of any alcoholic concentration therein.

A watch or simulated clock face is provided with an outer rotating bezel or scale therearound upon which is indicated blood alcohol concentration. The concentrations indicated are in diminishing values in a clockwise direction from 0.18 to 0, corresponding to the average fall of blood alcohol in gm./100 gm. in 12 hours. A limit means defines an arcuate distance through which the outer, movable scale is incrementally rotated clockwise with respect to the clock face, the arc representing the increase in alcoholic concentration for one preselected unit, for example as for one ounce of 100 proof whiskey. The arc defined by the limit means is adjustable according to the weight of the individual using the device, as the increase in alcoholic concentration resulting from a given amount of alcohol is less for heavier people than for lighter people. A third scale suitably inscribed on the device is used to properly set the arc defined by the adjustable stop means. Thus, with the zero mark on the outer scale or dial set at the time drinking begins, increases of blood alcohol are accounted for by rotating the outer dial through measured increments in a clockwise direction. Simultaneously the sweep of the hour hand (or imaginary hour hand) will automatically indicate the decrease of blood alcohol due to metabolism.

It is therefore a primary object of the present invention to provide an alcoholic concentration indicator for illustrating, at a glance, the theoretical alcoholic concentration in the blood of an average man at any time as a result of the intake of alcoholic beverages.

It is another object of the invention to provide a device of the type described which is adapted for practical use by persons of varying weight.

It is yet a further object of the present invention to provide a device of the type described which indicates the alcoholic concentration in the blood at any particular time after ingesting a given amount of liquor as well as indicating the time when the body of an average man will be free of alcohol.

A still further object in certain embodiments of the present invention is to provide a ready means for discreetly advancing the dial which indicates blood alcohol concentration through a prescribed arcuate increment.

Other objects and novel features of the dial will become apparent from the following specification and drawings which are merely exemplary, and in which:

FIGS. 9A and B are plan views illustrating the stop means of the embodiment shown in FIG. 8 removed from the watch;

Figure 1:
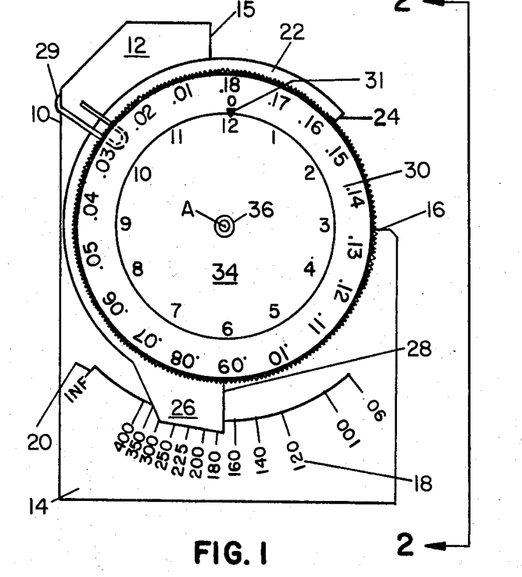
FIG. 1 is a plan view of a preferred embodiment of the present invention.
Figure 2:
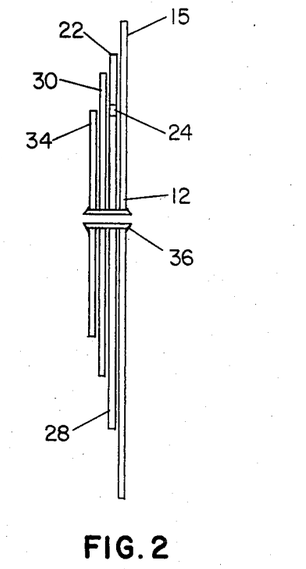
FIG. 2 is a view taken substantially along line 2—2 in FIG. 1.

Turning now to the drawings, and particularly to FIGS. 1 and 2, a preferred embodiment of a rotary dial 10 according to the present invention comprises a stationary base plate 12, an adjustable indicator plate 22, a first rotatable, blood alcohol content dial 30 and a second stationary clock dial 34, plate 22 and dials 30 and 34 being concentrically arranged and mounted to base plate 12 by a rivet 36 through the center thereof. Base plate 12 is formed from a generally flat rectangular sheet of stiff paper, plastic, aluminum, or other suitable material upon which indicator plate 22, dial 30 and clock dial 34 are mounted, and includes a lower portion 14 extending beyond plate 22 for purposes to be hereinafter described. A cut-out section defined by edge 15 and stop edge 16 is provided in the upper right hand corner of base plate 12 subtending an arc of approximately 90 degrees. A weight scale 18 is inscribed on the lower portion 14 of base plate 12 and is adapted for use as hereinafter described in adjusting the length of the prescribed arc of rotation through which the blood alcohol content dial 30 is discreetly moved during each manipulation of the device.

Indicator plate 22 is rotatably mounted about a common axis A with respect to base plate 12 and includes a generally circular plate having a tab 26 and a start edge 24 extending radially therefrom. Tab 26 is peripherally spaced from start edge 24 an arcuate distance of 90 to 180 degrees and includes a weight indication edge 28 on one side thereof which is adapted to overlie various positions on weight scale 18. The adjustment of tab 26 along scale 18 causes start edge 24 to move with respect to stop edge 16 on base plate 12 thereby defining a prescribed arc through which blood alcohol content dial 30 may be discreetly moved by inserting one's fingernail adjacent start edge 24, engaging the periphery of dial 30, and moving dial 30 clockwise to stop 16.

As illustrated best in FIG. 1, weight scale 18 is inscribed on lower extension 14 of base plate 12 in the following manner. The start edge 24 of indicator plate 22 is placed at a position coextensive with stop edge 16, whereupon the weight indication edge 28 defines an infinity mark 20 which represents an addition of 0 percent alcohol concentration per drink for a person of infinite weight. The indicia on weight scale 18 are then measured from the infinity mark 20 and marked according to the following table:

TABLE I

| Weight | Degrees of Arc | Corresponding Increase in Alcoholic Concentration (gm. per 100 gm.) from one oz. of 100 proof Whiskey |
|---|---|---|
| 400 lbs. | 18.9 | .0095 |
| 350 lbs. | 21.6 | .0108 |
| 300 lbs. | 25.2 | .0126 |
| 250 lbs. | 30.3 | .0151 |
| 225 lbs. | 33.6 | .0168 |
| 200 lbs. | 37.9 | .0189 |
| 180 lbs. | 42.1 | .0210 |
| 160 lbs. | 47.3 | .0237 |
| 140 lbs. | 54.1 | .0270 |
| 120 lbs. | 63.1 | .0315 |
| 100 lbs. | 75.7 | .0379 |
| 90 lbs. | 84.1 | .0421 |

Subsequently, in use, by placing weight indication edge 28 over the appropriate position indicating the user's weight on scale 18, the appropriate arc will then be set between start edge 24 and stop edge 16. A suitable fastening means such as a paper clip 29 or the like is then positioned to retain plate 22 in its adjusted position, so that the plate remains stationary in use.

The blood alcohol content dial 30 is rotatably mounted atop plate 22 on common axis A and is generally circular including a serrated edge 32. The dial 30, slightly smaller in diameter than indicator plate 22, includes diminishing alcoholic concentration indications, 0.18, 0.17, 0.16 - - to 0, marked in a clockwise direction and in equal increments therearound. The numbers are expressed in grams of alcohol/100 grams of blood and thus indicate 0.18 percent, 0.17 percent, 0.16 percent, etc. to 0.0 percent. If 0.015 gm. of alcohol per 100 gm. of blood are metabolized in one hour, then 0.18 gm. of alcohol per 100 gm. of blood are metabolized in 12 hours. As the hour hand sweeps clockwise it indicates the diminishing alcoholic concentration, and assuming a beginning value of 0.18 gm. per 100 gm., the sweep of the hour hand through twelve hours would illustrate the fall from 0.18 gm. to 0. A starting point 31 on dial 30 is initially positioned adjacent the time on clock face 34, indicating the time the alcoholic consumption is begun.

Clock face 34 may be either a conventional watch, clock, or may be a simulated clock face for purposes of use with the present invention. It should be noted that the minute and hour hands are unnecessary to the practice of the invention. The clock face 34 is stationary with respect to base plate 12, and a rivet 36 or other fastening device extends through the entire assembly maintaining base plate 12 and clock face 34 in a fixed position while indicator plate 22 and blood alcohol content dial 30 are rotatably mounted thereon. Indicator plate 22 should be so formed and assembled that it is relatively difficult to move, so that when the weight indication edge 28 is set at the position above weight scale 18, the plate 22 is relatively stationary. This feature may be accomplished as mentioned above by clipping base plate 12 and indicator plate 22 together with a paper clip or other holding device after the appropriate setting is made.

In operation, the dial is used by initially setting the weight indication edge 28 above the appropriate weight on scale 18, then retaining base plate 12 and indicator plate 22 in fixed relation with each other. The starting point 31 is them moved to the appropriate point on the clock face 34 indicating the time that the alcoholic consumption is begun. The arc between start edge 24 and stop 16 then fixes a limit means through which dial 30 is rotated in increments corresponding to the percentage increase of alcohol in the blood as a result of the consumption of one ounce (U.S.) of 100 proof whiskey, and the following table indicates some normal equivalents thereof:

TABLE II

Some Equivalents of One Ounce of 100-proof Whiskey

Beer — 12 ounces
Fortified Wine (20%) — 2.5 ounces
Table Wine (12%) — 4 ounces

Eighty to ninety proof whiskeys, gin, vodka or brandy in amounts of 1.25 to 1.1 ounces are equivalent to an ounce of 100 proof whiskey. That is to say, one ounce of 80 to 90 proof liquors would correspond to 0.8 to 0.9 of the arc representing one ounce of 100 proof whiskey. Therefore, the dial could easily be adapted to indicate the effect of consuming 80 or 90 proof whiskey by multiplying the degrees of arc in Table I by 0.8 or 0.9, however, use of the dial as described above will provide a usable approximation. The equivalent values of mixed drinks depend basically on the ounces of hard liquor in each drink.

The zero or starting point is set at the time the individual begins to drink. The blood alcohol content dial is advanced clockwise one increment (arcuate distance between stop edge 16 and start edge 24) for every ounce of 100 proof whiskey or its equivalent that is drunk. As second, third, or fourth drinks are taken, the bezel is advanced in a similar manner.

The alcoholic concentration at any given time, allowing about one hour for absorption, is indicated on dial 30 by the reading opposite the hour hand of the clock. As heretofore stated, a running clock is not necessary, however, it is desirable to have a clock face or simulated clock face, once the time of day is determined.

The time at which the theoretical average man will become alcohol free is indicated by the zero or starting point. The time at which the individual would reach a given concentration of blood alcohol less than the maximum he attained can also be seen by comparing the markings of the blood alcohol content dial 30 with the time opposite on the clock face 34.

To illustrate more specifically the practical application of the device, let us suppose that the embodiment exactly as illustrated in FIG. 1 is being used by a 175 lb. man. The tab 26 is fixed in the proper place. The arc from start edge 24 to stop edge 16 is about 43.3 degrees of arc and represents increments of 0.022 gm. of alcohol per 100 gm. of blood on dial 30. The man has been drinking since shortly before 5 p.m. At that time he set the zero mark 31 at just before 5 p.m. Thereafter in the next two hours or so he drank the equivalent of 5 ounces of 100 proof whiskey and rotated the dial 30 through arc 24 to 16 with each. Rotation was accomplished by engaging a fingernail on the serrated edge of dial 30 at start edge 24 and moving it until stopped by edge 16. As a consequence the dial has been rotated about 217 degrees of arc and the zero mark 31 is now at midnight. At 8 p.m. he consults the device. The blood alcohol concentration of the theoretical average man at 8 p.m. according to the device would be close to 0.06 gm. per 100 gm. of blood. The man plans to drive home about 10 p.m. The blood alcohol of an average man at that time should be about 0.03 gm. per 100 gm. of alcohol, a safe margin from the value of 0.10 which is conventionally considered as being "under the influence." At midnight the average man should be completely free of alcohol.

Figure 3:
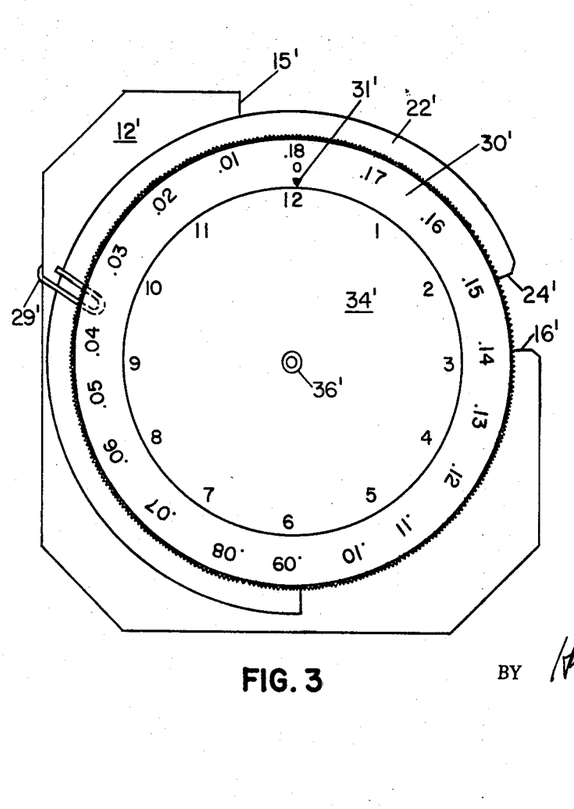
FIG. 3 is a plan view of a first alternate embodiment of the present invention looking at the front thereof.
Figures 4, 5, 6, 7:
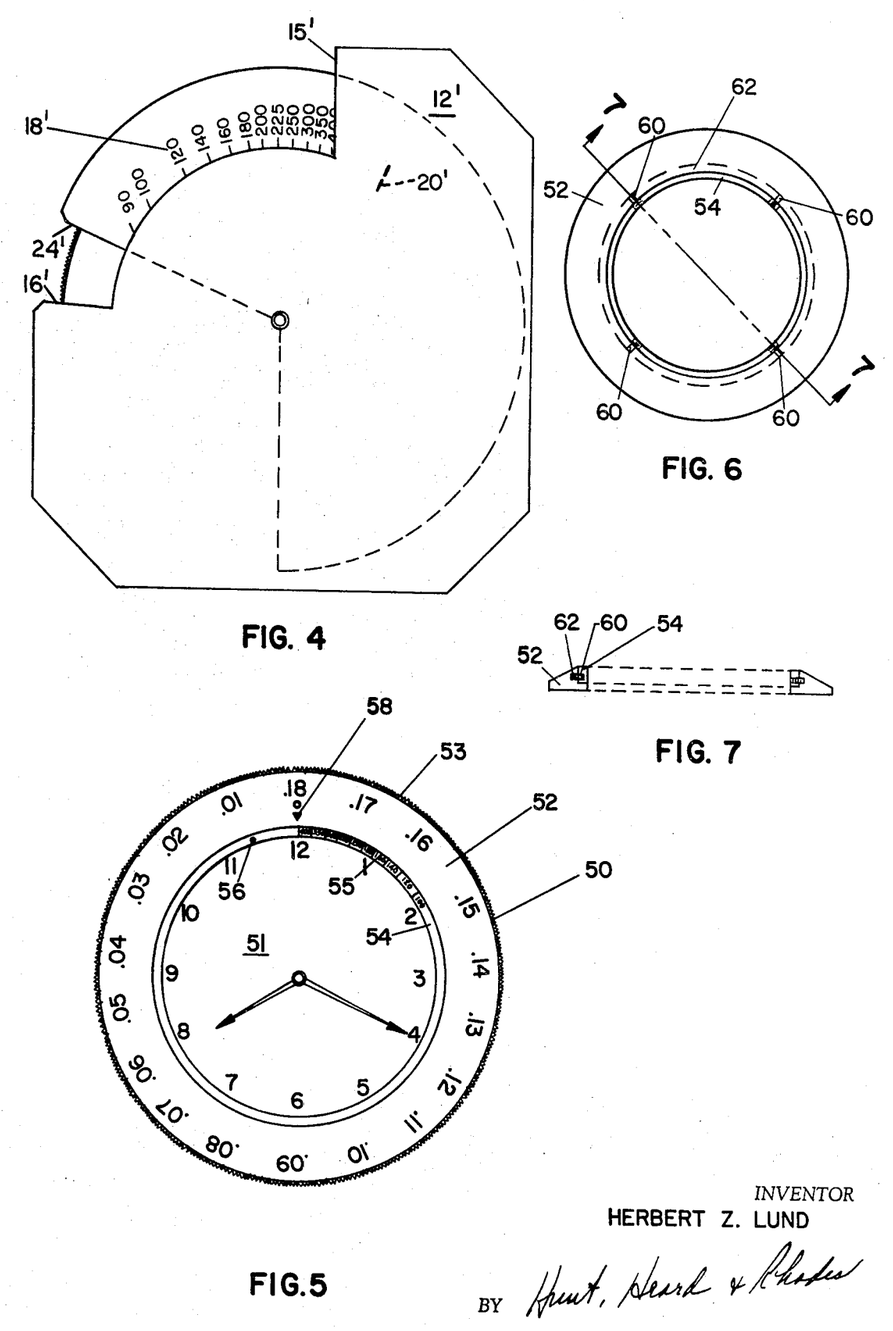
FIG. 4 is a plan view of the device shown in FIG. 3, except looking from the rear.
FIG. 5 is a plan view of a second alternate embodiment of the present invention, illustrating the adaptation of the device as a rotating bezel on a wrist watch.
FIG. 6 is a plan view, similar to FIG. 5, except showing the bezel alone removed from the watch.
FIG. 7 is a sectional view taken substantially along line 7—7 in FIG. 6.

Turning now to the embodiment illustrated in FIGS. 3 and 4, the rotating dial is similar to that shown in FIGS. 1 and 2, except the weight scale 18 has been moved to the rear of indicator plate 22' as shown in FIG. 4, so that the edge of indicator plate 22 becomes the weight indication edge 28. Base plate 12' includes the arcuate cutout in the upper right hand corner defined by edge 15' and stop edge 16' similar to plate 12 of FIGS. 1 and 2. In laying out weight scale 18' on the rear of plate 22', start edge 24' is again moved to a position coextensive with stop edge 16'. The infinity mark 20' is then defined beneath edge 15', and the weight markings measured and marked on the rear of indicator plate 22' as illustrated in FIG. 4 and according to Table I set forth hereinabove.

Such an embodiment eliminates the lower extension 14 of base plate 12, resulting in a more compact, square configuration than before. Otherwise, the dial is fabricated and operates in the same way as that of the embodiment shown in FIGS. 1 and 2.

FIGS. 5 through 7 illustrate a second alternate embodiment of the invention in the form of a bezel 50 having a serrated outer edge 53 and being rotatably mounted around the periphery of a watch face 51. The bezel 50 comprises a pair of concentric rings 52 and 54 with outer ring 52 indicating alcohol concentration and including indicia inscribed thereon similar to that illustrated on indicator dial 30 in FIG. 1. Inner ring 54 is adjustably mounted to and adjacent the inner wall of outer ring 52 and in use normally rotates therewith around the watch face 51, however, the inner ring 54 is also independently adjustable with respect to outer ring 52, so that a limit means in the form of stopping point 56 may be positioned counterclockwise a prescribed arcuate distance from zero point 58 on outer ring 52. A weight scale 55 is inscribed on the face of inner ring 54 for indicating various weights at arcuately spaced point from stopping point 56 according to Table I.

In use, the bezel 50 is initially set by adjusting inner ring 54 with respect to outer ring 52 to align the appropriate weight on scale 55 opposite zero point 58 on outer ring 52, whereby stopping point 56 is then properly spaced from the zero point. After setting zero point 58 opposite the time indicated on watch face 51 that drinking commences, the bezel 50 is subsequently moved clockwise from the starting position shown in FIG. 5, upon consumption of one ounce of 100 proof whiskey or its equivalent, a distance corresponding to the arc between stopping point 56 and zero point 58. Thus, stopping point 56 assumes the position, relative to the watch face, previously occupied by starting point 58. As consumption continues, stopping point 56 is sequentially moved with each drink the same arcuate distance.

Inner ring 54 is attached to outer ring 52, as illustrated in FIGS. 6 and 7, by means of a plurality of set screws 60 inserted radially through openings in inner ring 54. The inner surface of outer ring 52 and the outer surface of inner ring are coextensive and contiguous, with an annular groove 62 being cut in the inner surface of outer ring 52 for receiving set screws 60 as illustrated in FIG. 7. Inner ring 54 is relatively tightly attached to outer ring 52, so that in normal use, the inner and outer rings rotate together, however inner ring 54 may be moved relative to outer ring 52 if desired point 56 may be a slight depression, groove, or upstanding peg which may be firmly engaged by a pointed instrument or with the fingernail to move inner ring 54 while holding outer ring 52 stationary by grasping the serrated edge 53 of outer ring 52 by the fingers of the other hand.

Figure 8:
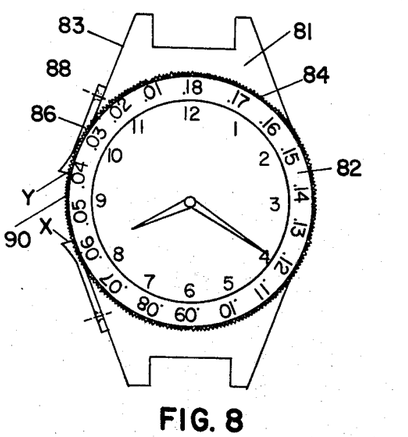
FIG. 8 is a plan view of a wrist watch having a rotating bezel mounted thereon according to a third alternate embodiment of the present invention.
Figure 9:
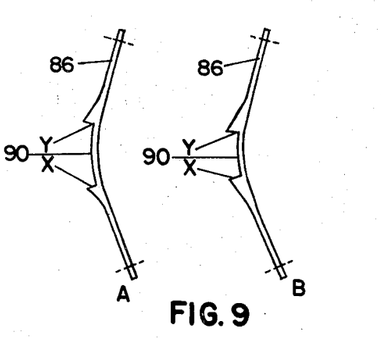

FIGS. 8 and 9 represent still another alternate embodiment of the invention and comprise a watch or clock face 80 having a bezel 82 rotatably mounted therearound. Bezel 82 bears alcohol concentration indicia marked on the surface thereof similar to that shown on indicator plate 30 in FIG. 1. The outer edge of bezel 82 is provided with a series of serrations 84, a limit means in the form of an attachment 86 conforming to the configuration of the casing 87 is fastened to one side 83 of the watch casing by any suitable means such as screws 88. Attachment 86 includes therein an arcuate, cut-out segment 90 which is of an arcuate length corresponding to the appropriate weight listed in Table I. Moreover, the arcuate cut-out 90 is of such radial depth as to expose the serrated edge of bezel 82 between edges x and y for easy, discreet manipulation of the bezel. In use, a person purchases an attachment having an arcuate cut-out 90 corresponding to his weight and the segment is thereby only adjustable at the time of purchase. When operating bezel 82, a fingernail engages one of serrations 84 at start edge x and the bezel is moved to the stop edge y, whereby the prescribed arc of the bezel is subtended to correspond to the increased alcoholic concentration resulting from one drink.

Figure 10:
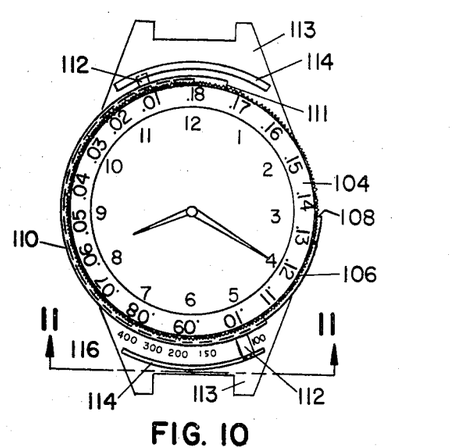
FIG. 10 is a plan view of a watch having a bezel mounted thereon according to a fourth alternate embodiment of the present invention.
Figure 11:
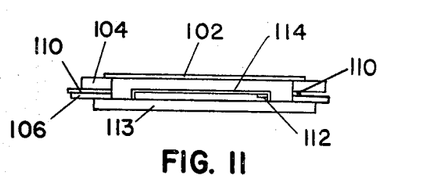
FIG. 11 is a sectional view taken substantially along lines 11—11 in FIG. 10.

FIGS. 10 and 11 illustrate yet a further alternate embodiment of the invention comprising a watch face 102 and a serrated bezel 104 rotatably attached thereto for movement therearound. Again the alcohol concentration is expressed in hundredths of percent, so that the indicia inscribed on bezel 104 are similar to that inscribed on indicator plate 30 in FIG. 1. The limit means for adjusting the arc through which bezel 104 is incremently moved includes a first, fixed guard 106 partially surrounding bezel 104 and having a fixed stop edge 108 protruding outwardly from the side of bezel 104.

A second, adjustable guard 110 also partially surrounds bezel 104 adjacent fixed guard 106, and includes a start edge 111 which is movable with respect to stop edge 108 to adjust the size of the arc therebetween. A pair of tabs 112 protrude outwardly from adjustable guard 110 and are frictionally received beneath retainer plates 114 which in turn are mounted on the surface of the watch casing 113 on either side of the watch face 102. A weight scale 116 is inscribed on the casing of the watch underlying one of the protruding tabs 112, in this example the right edge of the lower tab, so that the arc between start edge 111 of movable guard 110 and the stop edge 108 of fixed guard 106 may be adjusted according to Table I. The weight scale 116 is set up by first bringing start edge 111 and stop edge 108 together, so that the right edge of the lower tab 112, if extended beyond retainer plate 114, indicates the infinity mark, then measuring increments along weight scale 116 according to Table I. In operation the arc between start edge 111 and stop edge 108 is set and the device used in the manner described in the embodiments set forth hereinabove.

Figure 12:
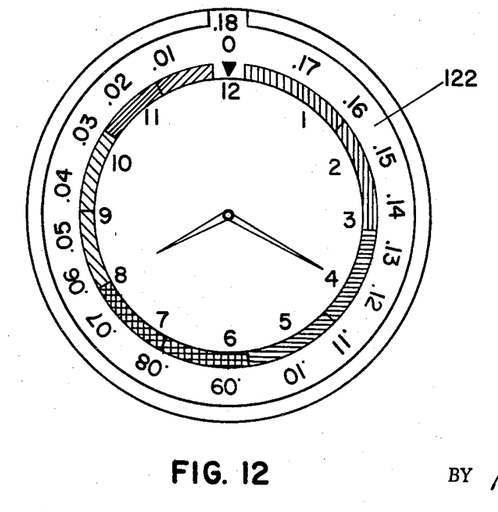
FIG. 12 is a plan view of a fifth alternate embodiment of the present invention.

One final embodiment of the rotary dial is illustrated in FIG. 12 and comprises a watch or clock face 120 having a bezel 122 mounted for rotation therearound. The face of bezel 122 includes the alcoholic concentration indicia previously described as well as a series of colored arcuate bands and half-bands around the inner edge thereof. Each arcuate band is represented by a different color and subtends a differing number of degrees around the watch face. The bands of colors on the bezel vary in length according to the weight which they represent as indicated by the following chart:

| Weight in pounds | Degrees of arc to advance bezel for each fluid ounce of 100 proof whiskey or its equivalent. | Corresponding color segment |
|---|---|---|
| 87.5 | 86.6 | full red segment |
| 100 | 75.7 | full blue segment |
| 112.5 | 67.3 | full yellow segment |
| 125 | 60.6 | full green segment |
| 150 | 50.5 | full brown segment |
| 175 | 43.3 | half red segment |
| 200 | 37.85 | half blue segment |
| 225 | 33.65 | half yellow segment |
| 250 | 30.3 | half green segment |
| 300 | 25.25 | half brown segment |

For each ounce of 100 proof whiskey or its equivalent the bezel is advanced the segment or half-segment that most closely matches the weight of the individual. For example, a 175 pound man would advance the bezel one-half the red segment for each ounce of 100 proof whiskey consumed (or a full red segment for two ounces).

Turning now to the embodiment illustrated in FIGS. 13–16, it is contemplated that the present invention is adaptable for use with a wall clock or simulated wall clock in the manner herein described. A base plate 130 is adapted to be mounted on a wall or includes legs or a stand (not shown) wherein the clock may be mounted on a supporting surface. A central bearing 132 extends forwardly from base plate 130, and an activating lever 134 is pivotally attached at one end around central bearing 132 at a point adjacent to, but spaced slightly from, the base plate. Lever 134 in its normal position engages a return stop 140 and includes a starting edge 136 falling along a zero line 138, both edge 136 and zero line 138 being a portion of a radius extending from the center of central bearing 132, which is also a common center for the alcohol concentration dial 142 and clock face 145.

Figure 13:
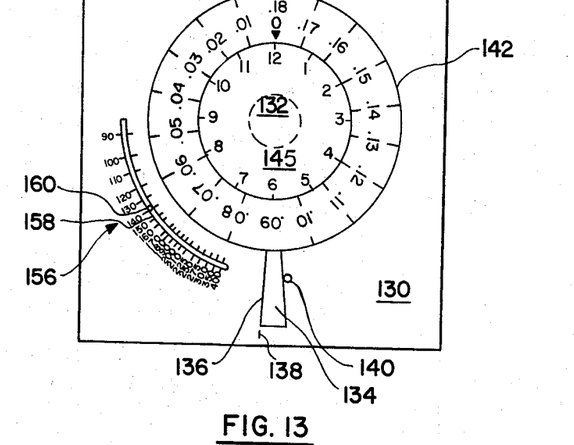
FIG. 13 is a plan view of a sixth alternate embodiment of the present invention.

Alcohol concentration dial 142 is rotatably attached to central bearing 132, while the clock face or simulated clock face 145 is stationarily attached to the front end of bearing 132. The dial 142 is marked on its face in the same manner as dial 30 in FIG. 1.

A cog wheel 146 is secured to the rear surface of a boss 143 extending rearwardly from dial 142 for the purpose of slightly spacing the cog wheel 146 from dial 142. A series of teeth 144 around the periphery of cog wheel 146 adapt the dial 142 for controlled rotational movement as hereinafter described.

A first, curved ratchet arm 147 is pivotally attached to a boss 148 protruding forwardly from the surface of activating lever 134. The free end of arm 147 extends into the arc subtended by teeth 144, so that a clockwise movement of lever 134 (FIG. 14) will cause a resulting rotation of the alcohol concentration dial 142. When the lever 134 is released however its own weight or a return spring (not shown) will return the lever 134 to its normal position, and the angular configuration of arm 147 does not impede movement of lever 134 in a counterclockwise direction. A second stationary, but pivotal, ratchet arm 150 is pivotally mounted to a boss 152, which in turn is attached to a stationary mounting plate 154 on the opposite side of cog wheel 146 from the first movable ratchet arm 147. The second arm 150 is so configured as to permit rotational movement of dial 142 in a clockwise direction, however engages teeth 144 to prevent counterclockwise movement of the dial as the lever 134 returns to its normal position.

Figure 14:
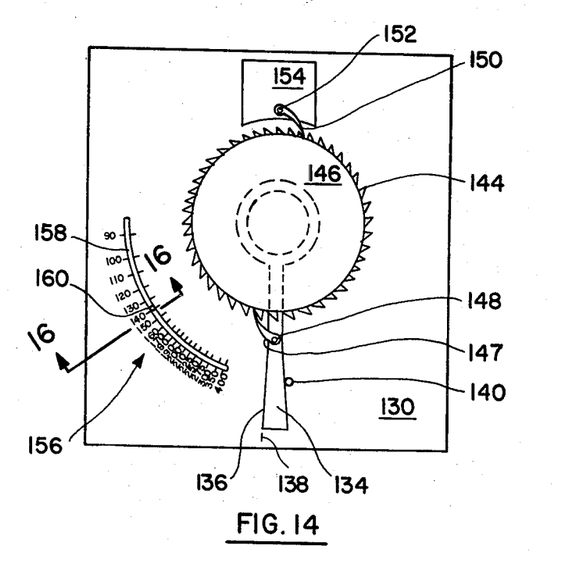
FIG. 14 is a plan view similar to FIG. 13, except with the clock face and alcohol concentration dial removed.
Figure 15:
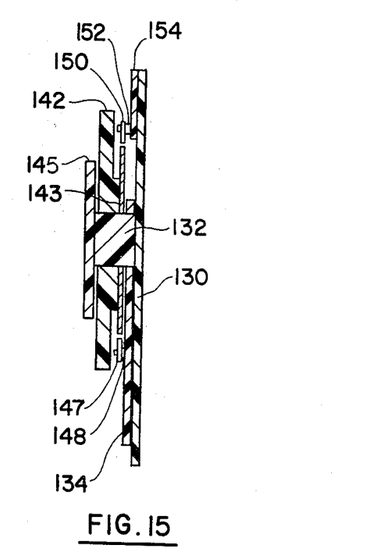
FIG. 15 is a sectional view taken substantially along lines 15—15 of FIG. 13.
Figure 16:
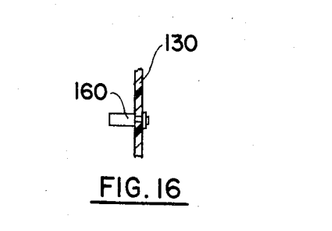
FIG. 16 is a sectional view taken substantially along lines 16—16 of FIG. 13.

An arcuate weight scale 156 is inscribed on the surface of base plate 130 in the path of activating lever 134, and includes an arcuate slot 158 for receiving an adjustable stop pin 160. The stop pin may be moved to any position along weight scale 156 desired, then fastened to provide an adjustable stop for the purpose of terminating the pivotal movement of activating lever 134.

In operation, adjustable stop pin 160 is moved to the position within slot 158 adjacent the corresponding weight of the user on weight scale 156. The weights indicated on weight scale 156 are measured from the zero line 138 according to Table I. Subsequently, upon the consumption of the equivalent of one ounce of alcohol, the activating lever 134 is moved through an arc until it engages adjustable stop pin 160. Such movement causes the free end of first ratchet arm 147 to engage the teeth 145 of cog wheel 146 and move the alcohol concentration dial 142 through an arc corresponding to that subtended by lever 134. The lever is then released and returns to its initial position, and the second ratchet arm 150 prevents the return of cog wheel 146 along with dial 142.

It is apparent that many modifications of this device can be made. Additional scales have been designed, for example, which make allowances for varying proofs of liquor being consumed and different alcohol concentration dials to denote concentration in gm. per 100 ml. instead of gm. per 100 gm. Moreover, different alcohol concentration dials could easily be designed to accommodate a higher or lower rate of metabolism than the average value of 0.015 gm. per 100 gm. per hour used here, should medical research show that some other average value is more accurate.

While the invention has been illustrated and described according to the embodiments above, it is not intended to be limited to the details shown, since various modifications and structural changes may be made without departing in any way from the spirit of the present invention.

What is claimed is:

1. An alcoholic concentration indicator comprising:
   a. at least two concentric circular dials, the first dial having alcohol concentration indicia thereon, the second dial having time indicia thereon, said first dial being rotatably attached to the second dial;

b. limit means for defining an arcuate distance through which said first dial is incrementally rotated with respect to said second dial whereby as the increase of alcohol concentration is programmed into said first dial by movement of the first dial upon consumption, the disappearance of alcohol in the system resulting from the passage of time is programmed into the first dial by reference to said second dial; and c. means for adjusting the spacing between said limit means to selectively alter said arcuate distance, whereby the increment through which said first dial is rotated may be selected according to the weight of the user.

2. The indicator according to claim 1 wherein said limit means comprises a start edge and a stop edge extending radially beyond and adjacent to the periphery of said first dial for defining the arcuate distance said first dial is advanced with each incremental movement.

3. The indicator according to claim 2 wherein at least one of said start and stop edges is adjustable around the periphery of said first dial with respect to the other of said start and stop edges to define the adjusting means for altering the arcuate distances therebetween.

4. The indicator according to claim 1 wherein said circular dials are mounted on a stationary base plate, said base plate including a stop edge extending radially beyond and adjacent to the periphery of said first dial, an indicator plate concentric with said first and second dials, said indicator plate being rotatably attached to said base plate and including a start edge extending radially beyond and adjacent to the periphery of said first dial, said start edge being arcuately adjustable around the periphery of said first dial with respect to said stop edge to the adjusting means for altering the arcuate distances therebetween, and means for maintaining said indicator plate in fixed relation to said base plate after the arcuate adjustment between said start and stop edges has been made.

5. The indicator according to claim 4 wherein said base plate includes a weight indicating scale inscribed thereon and said indicator plate includes a tab arcuately spaced from said start edge and extending radially beyond said first dial, said tab overlying said weight scale and movable relative therealong in response to the rotation of said indicator plate, whereby the alignment of said tab with a selected point on said weight indicating scale sets said start edge at a prescribed arcuate distance from said stop edge.

6. The indicator according to claim 5 wherein the peripheral edge of said first dial is serrated.

7. The indicator according to claim 4 wherein said base plate includes a second edge arcuately spaced around said dials from said stop edge and extending radially beyond said first dial, a weight scale inscribed on the rear surface of said indicator plate adjacent the periphery thereof, said second edge overlying said weight scale, whereby the alignment of said second edge with a selected point on said weight scale sets said start edge at a prescribed arcuate distance from said stop edge.

8. The indicator according to claim 7 wherein the peripheral edge of said first dial is serrated.

9. The indicator according to claim 2 further comprising a watch having a face forming said second dial, said first dial comprising an annular bezel rotatably attached to said watch face.

10. The indicator according to claim 9 wherein said watch includes a case and said limit means comprises an arcuate shaped attachment bar attached to said case along the side thereof immediately beneath said bezel, said attachment bar including an arcuate cut-out defined by said start edge and said stop edge, both of said edges protruding radially beyond the periphery of said bezel, thus exposing an arcuate segment of the peripheral edge of said bezel, said cut-out being of a prescribed arcuate length corresponding to the weight of the user, the peripheral edge of said bezel being serrated.

11. The indicator according to claim 9 wherein said bezel comprises an outer and an inner ring, said inner ring being selectively rotatable with respect to said outer ring, the alcohol indicia and a zero point being inscribed on said outer ring, a weight scale and index mark being inscribed on said inner ring, whereby said zero point is initially aligned with a selected point on said weight scale to set said stopping index mark a prescribed arcuate distance from said zero point.

12. The indicator according to claim 11 wherein said outer ring includes a slot around the inner surface thereof, said inner ring being rotatably received with said slot.

13. The indicator according to claim 1 further comprising a watch casing having a face forming said second dial, said first dial comprising an annular bezel rotatably attached to said watch face, a fixed stop edge attached to said casing and extending radially beyond and adjacent to the peripheral edge of said bezel, an adjustable guard rotatably attached to said watch casing and concentric to said first and second dials, said adjustable guard including a start edge extending radially beyond and adjacent to said bezel, said start edge being peripherally adjustable around said bezel with respect to said stop edge to define the adjustable means for altering the arcuate distances therebetween, and means for retaining said adjustable guard in fixed relation to said stop edge after the arcuate adjustment between said start and stop edges has been made.

14. The indicator according to claim 13 wherein said watch casing includes a weight indicating scale inscribed thereon and said adjustable guard includes a tab arcuately spaced from said start edge and extending radially beyond the periphery of said bezel, said tab overlying said weight scale and movable relative thereto in response to the rotation of said adjustable guard, whereby the alignment of said tab with a selected point on said weight indicating scale sets said start edge at a prescribed arcuate distance from said stop edge.

15. The indicator according to claim 14 wherein the peripheral edge of said bezel is serrated.

16. The indicator according to claim 14 wherein said means for retaining said guard in a fixed position after said arcuate adjustment has been made comprises a retainer plate spaced from the surface of said casing, said tabs being frictionally received beneath said plate.

17. The indicator according to claim 1 wherein said limit means comprises a series of arcuate segments inscribed on said first dial, said arcuate segments being of varying lengths according to the weight of the user.

18. The indicator according to claim 1 wherein said limit means includes an adjustable stop, said first dial being movable throughout said arcuate distance in response to the movement of an activating lever, said lever being selectively engageable with said first dial through a ratchet arrangement, whereby said lever engages said first dial to move it in one direction, however is permitted to return to its normal position by said ratchet arrangement without return movement of said first dial.

19. The indicator according to claim 18 further comprising a base plate upon which are mounted said first and second dials, said base plate including a slot therein, said adjustable stop including a pin selectively fixed at prescribed positions within said slot.

20. The indicator according to claim 18 wherein said ratchet arrangement includes a cog wheel having teeth around the periphery thereof connected to said first dial and a ratchet arm pivotally mounted on said lever in engagement with the teeth of said cog wheel, said ratchet arm operable to engage said teeth upon movement in one direction, and disengage from said teeth upon return movement in an opposite direction.

21. The indicator according to claim 18 and further comprising a base plate having a central bearing extending therefrom, said first dial being rotatably mounted around said bearing, said second dial being non-rotatably mounted to said bearing, said lever being rotatably mounted at one end thereof around said bearing, said ratchet arrangement includes a cog wheel having teeth around the periphery thereof connected to said first dial and a ratchet arm pivotally mounted on said lever engageable with the teeth of said cog wheel, said ratchet arm operable to engage said teeth upon movement in one direction, and disengage from said teeth upon return movement in an opposite direction.

22. The indicator according to claim 21 wherein said base plate includes an arcuate slot therein in the path of said lever and adjacent a weight scale inscribed thereon, said adjustable stop including a pin selectively fixed at prescribed positions within said slot.

* * * * *